United States Patent
Houng et al.

(10) Patent No.: US 7,684,662 B2
(45) Date of Patent: Mar. 23, 2010

(54) AD CONVERTER USING PHOTONIC CRYSTAL

(75) Inventors: Young-Tack Houng, Suwon-Si (KR); Nam-Kyoo Park, Seoul (KR); Sang-Wook Kwon, Seongnam-Si (KR); In-Sang Song, Seoul (KR); Jong-Seok Kim, Hwaseong-Si (KR); Suk-Mo Koo, Goyang-Si (KR); Sun-Kyu Yu, Seoul (KR)

(73) Assignees: Samsung Electronics Co., Ltd., Suwon-Si (KR); Seoul National University Industry Foundation, Seoul (KR)

( * ) Notice: Subject to any disclaimer, the term of this patent is extended or adjusted under 35 U.S.C. 154(b) by 39 days.

(21) Appl. No.: 12/195,621

(22) Filed: Aug. 21, 2008

(65) Prior Publication Data

US 2009/0142014 A1  Jun. 4, 2009

(30) Foreign Application Priority Data

Dec. 4, 2007  (KR) ...................... 10-2007-0125096

(51) Int. Cl.
*G02B 6/12* (2006.01)
*G02F 1/035* (2006.01)

(52) U.S. Cl. ........................................... 385/14; 385/2

(58) Field of Classification Search .................. 385/1–3
See application file for complete search history.

(56) References Cited

U.S. PATENT DOCUMENTS

| 5,381,147 A * | 1/1995 | Birkmayer ................... 341/137 |
| 6,100,831 A * | 8/2000 | Frankel ....................... 341/137 |
| 6,118,396 A * | 9/2000 | Song .......................... 341/137 |
| 6,529,150 B1 * | 3/2003 | Shoop et al. ................. 341/137 |
| 6,832,033 B2 * | 12/2004 | Prather et al. ............... 385/129 |
| 7,212,140 B2 * | 5/2007 | Soderberg et al. ........... 341/137 |
| 2006/0034577 A1 * | 2/2006 | Furuya et al. ............... 385/129 |
| 2008/0019648 A1 * | 1/2008 | Atwater et al. .............. 385/122 |

FOREIGN PATENT DOCUMENTS

JP  2004037587 A  *  2/2004

* cited by examiner

*Primary Examiner*—Michelle R Connelly Cushwa
(74) *Attorney, Agent, or Firm*—DLA Piper LLP US (57) ABSTRACT

An AD converter is provided. The AD converter includes a light source unit which provides an optical signal, at least one waveguide unit which consists of a photonic crystal and transmits the optical signal, a modulation unit which applies a RF signal to the at least one waveguide unit, thereby modulating an optical signal output from the at least one waveguide unit, and a digital conversion unit which converts the modulated optical signal to a digital signal. Accordingly, a compact-sized AD convert can be realized.

16 Claims, 12 Drawing Sheets

AD CONVERTER USING PHOTONIC CRYSTAL

CROSS-REFERENCE TO RELATED APPLICATIONS

This application claims priority from Korean Patent Application No. 10-2007-125096, filed Dec. 4, 2007, in the Korean Intellectual Property Office, the disclosure of which is incorporated herein by reference in its entirety.

BACKGROUND OF THE INVENTION

1. Field of the Invention

Methods and apparatuses consistent with the present invention relate to an AD converter, and more particularly, to an AD converter using a photonic crystal.

2. Description of the Related Art

Various signals in nature continuously change with time. In order to understand a phenomenon in nature, it is necessary to measure magnitudes of analog signals which continuously change with time. Also, measured values may be processed and analyzed through a computer. In order to process and analyze the analog signals through a computer, a device that can convert the analog signals to digital signals which are processable by the computer is required. Such a device is referred to as an analog to digital (AD) converter.

Since a CMOS-based AD converter which has been widely used utilizes an electric signal, it has a limitation in realizing a high speed operation and a high resolution. In particular, it is difficult to obtain a sampling speed of more than 10 Gs/s due to a jitter of the electric signal.

A photonic AD converter utilizing light as a signal has been used as an alternative to the CMOS-based AD converter. A Taylor' structure using a Mach-Zehnder interferometer is generally known to an ordinary skilled person in the art as the photonic AD converter.

However, the AD converter has to have a large size as the number of bits increases. Therefore, there is a problem that power consumption increases.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a compact AD converter which is capable of processing a sampling at a high speed and also achieving a high resolution.

According to an aspect of the present invention, there is provided an AD converter, including a light source unit which provides an optical signal, at least one waveguide unit which consists of a photonic crystal and transmits the optical signal, a modulation unit which applies a RF signal to the at least one waveguide unit, thereby modulating an optical signal output from the at least one waveguide unit, and a digital conversion unit which converts the modulated optical signal to a digital signal.

The at least one waveguide unit may include an electrode which is applied with the RF signal, a first waveguide which is connected to the electrode, and a second waveguide which is symmetrical to the first waveguide in its shape to share the optical signal with the first waveguide, and, if the RF signal is applied to the first waveguide, outputs an optical signal having a phase difference from that of the optical signal output from the first waveguide, and the first and the second waveguides each may have a Coupled Resonator Optical Waveguide (CROW) structure.

A plurality of waveguide units may be provided, and electrodes included in the waveguide units may have different lengths from one another.

The at least one waveguide unit may include a waveguide which has a Coupled Resonator Optical Waveguide (CROW) structure and is provided with at least one resonator, and the modulation unit may move optical signals output from the at least one waveguide unit parallel with one another.

The at least one waveguide unit may further include an electrode which is connected to the waveguide to apply the RF signal.

A plurality of waveguide units may be provided, and electrodes included in the waveguide units may have different lengths from one another.

The at least one waveguide unit may include a waveguide, and a resonator which is disposed on the waveguide.

The modulation unit may move optical signals output from the at least one waveguide unit parallel with one another.

The resonator may include a plurality of first dielectrics which is formed on the waveguide, and a second dielectric which has a different permittivity from that of the plurality of first dielectrics and is arranged between the plurality of first dielectrics to allow an optical signal output from the waveguide to resonate at a specific wavelength.

The at least one waveguide unit may include a first waveguide, a second waveguide which is symmetrical to the first waveguide in its shape to share the optical signal with the first waveguide, and at least one filter which is disposed between the first and the second waveguides and pulls one of optical signals input to the first waveguide that has a specific wavelength toward the second waveguide.

The at least one filter may include a plurality of resonators each including a plurality of first dielectrics which is disposed between the first and the second waveguides and a second dielectric which has a different permittivity from that of the plurality of first dielectrics and is disposed between the plurality of first dielectrics.

The modulation unit may move optical signals output from the second waveguide parallel with one another, and the digital conversion unit may digitally convert the optical signals output from the second waveguide and moved parallel.

The AD converter may further include an input silicon waveguide which receives the optical signal output from the light source unit, an input photonic crystal waveguide which transmits the optical signal output from the input silicon waveguide to the at least one waveguide unit, and a connector which connects the input silicon waveguide and the input photonic crystal waveguide and is in a tapered shape.

The AD converter may further include an output photonic crystal waveguide which receives the optical signal output from the at least one waveguide unit, an output silicon waveguide which transmits the optical signal output from the output photonic crystal waveguide to the digital conversion unit, and a connector which connects the output silicon waveguide and the output photonic crystal waveguide and is in a tapered shape.

The digital conversion unit may include a light detector which detects a magnitude of the optical signal output from the at least one waveguide unit, an amplifier which amplifies the magnitude of the signal detected by the light detector, and a comparator which compares the amplified signal with a reference signal and outputs a comparison result value.

The modulation unit may change a refraction index of a waveguide of the at least one waveguide unit using a plasma dispersion effect.

The modulation unit may perform a modulation using either a reversed biased PN junction or a forward biased p-i-n junction.

BRIEF DESCRIPTION OF THE DRAWINGS

Above and other aspects of the present invention will become apparent and more readily appreciated from the following description of the exemplary embodiments, taken in conjunction with the accompany drawings of which.

DETAILED DESCRIPTION OF EXEMPLARY EMBODIMENTS

Certain exemplary embodiments of the present invention will be described in greater detail with reference to the accompanying drawings.

In the following description, the same drawing reference numerals are used for the same elements even in different drawings. The matter defined in the description, such as detailed construction and elements, are provided to assist in a comprehensive understanding of the invention. Thus, it is apparent that the exemplary embodiments of the present invention can be carried out without this specifically defined matter. Also, well-known functions or constructions are not described in detail since they would obscure the invention with unnecessary detail.

Figure 1:
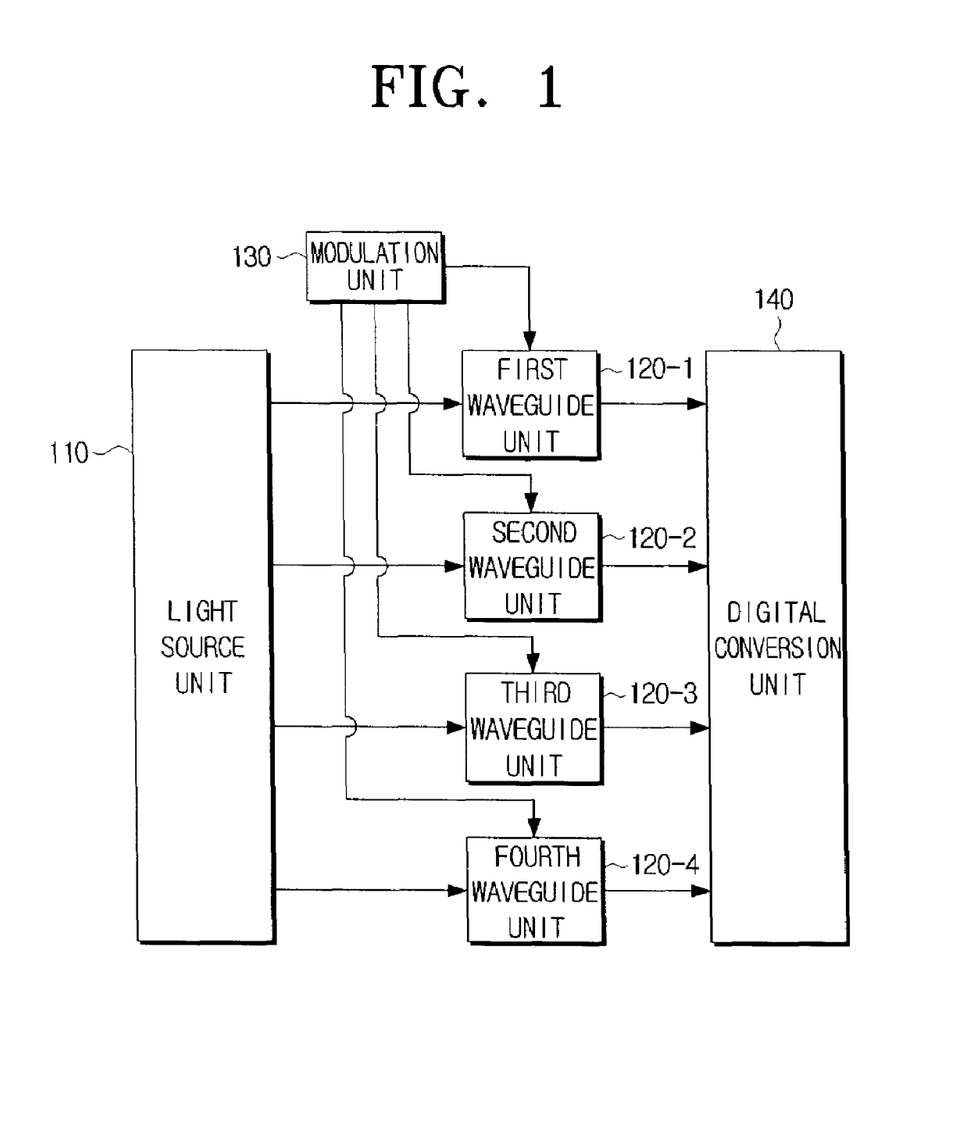
FIG. 1 is a block diagram illustrating an AD converter according to an exemplary embodiment of the present invention.

FIG. 1 is a block diagram illustrating an AD converter according to an exemplary embodiment of the present invention. Referring to FIG. 1, an AD converter according to an exemplary embodiment of the present invention comprises a light source unit 110, first through fourth waveguide units 120-1 to 120-4, a modulation unit 130, and a digital conversion unit 140.

The light source unit 110 provides an optical signal. The optical signal provided by the light source unit 110 may be of a continuous wave or may be a discrete signal which generates only a pulse. However, in order to achieve a high speed sampling, the optical signal should be of a Continuous Wave (CW) because an amplitude or magnitude of the CW signal does not change like a sine wave in a normal condition. The waveguide units 120-1 to 120-4 each consists of photonic crystals and transmits the optical signal. The modulation unit 130 applies a RF signal to the first through the fourth waveguide units 120-1 to 120-4, thereby modulating optical signals output from the first through the fourth waveguide units 120-1 to 120-4. The digital conversion unit 140 converts the modulated optical signals to digital signals. Although four waveguide units are shown in FIG. 1, the number of waveguide units is not limited and is variable.

Figure 2A:
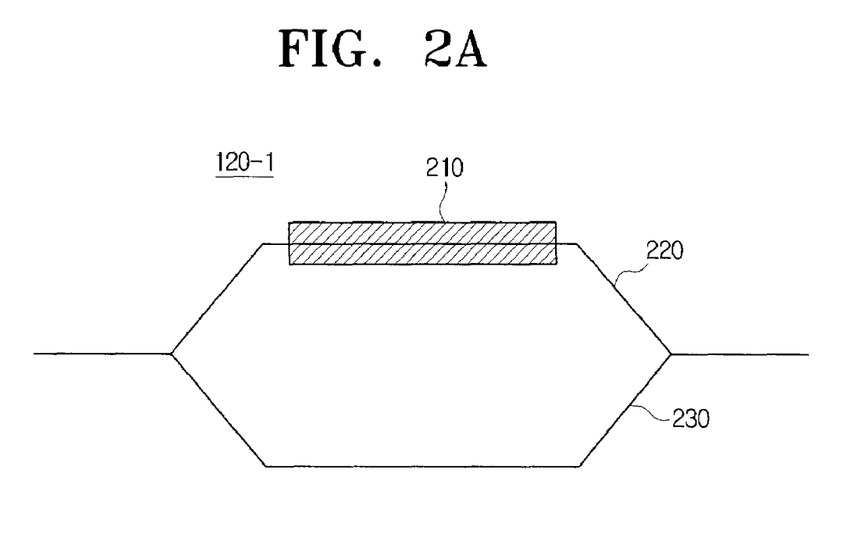
FIG. 2A is a view illustrating an example of a first waveguide unit of the AD converter of FIG. 1.
Figure 2B:
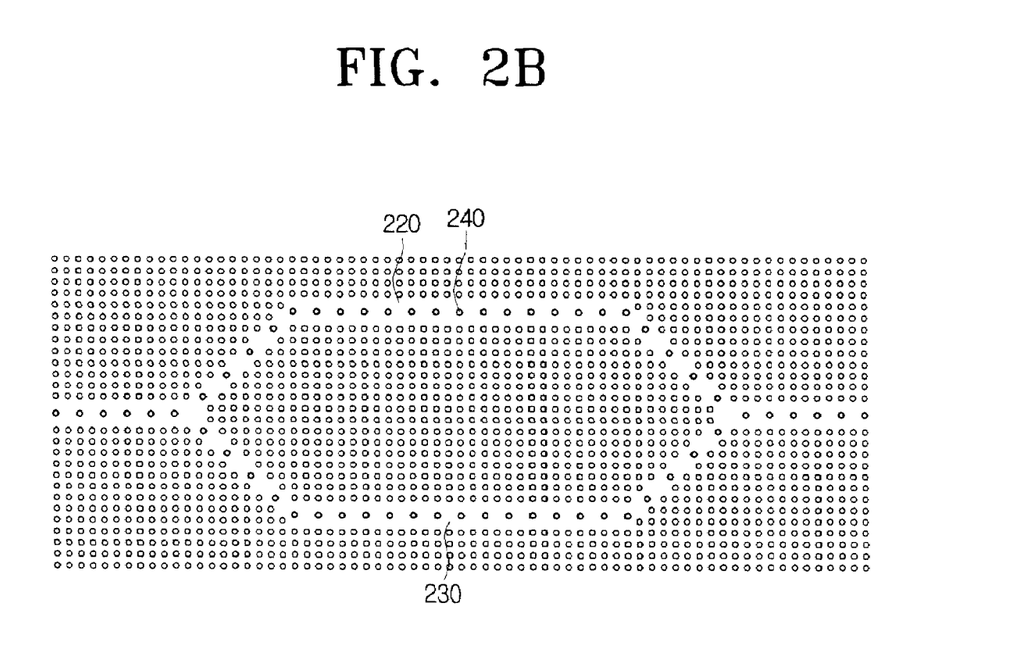
FIG. 2B is a view illustrating the first waveguide unit of FIG. 2A in a photonic crystal.

FIG. 2A is a view illustrating an example of the first waveguide unit applicable to the AD converter according to the exemplary embodiment of the present invention, and FIG. 2B is a view illustrating the first waveguide unit of FIG. 2A in a photonic crystal pattern. The configuration of FIGS. 2A and 2B can be applied to the second through the fourth waveguide units.

Referring to FIG. 2A, the first waveguide unit 120-1 comprises an electrode 210, a first waveguide 220, and a second waveguide 230. The electrode 210 receives the RF signal from the modulation unit 130 and may be connected to the first waveguide 220. The second waveguide 230 is symmetrical to the first waveguide 220 in its shape and shares the optical signal with the first waveguide 220. If a RF signal is applied to the first waveguide 220, a refractive index of the first waveguide 220 changes and accordingly a phase of the optical signal passing through the first waveguide 220 also changes. As a result, the optical signal passing through the first waveguide 220 is combined with an optical signal a phase of which does not change at the second waveguide 230 and thus a combined signal is output.

Referring to FIG. 2B, both the first waveguide 220 and the second waveguide 230 are of a Coupled Resonator Optical Waveguide (CROW) structure. Accordingly, cavities are arranged along the first and the second waveguides 220 and 230 so that a velocity of the optical signal can be slowed. The CROW structure can greatly reduce a group velocity of light passing through a photonic crystal waveguide. More specifically, the CROW structure is fabricated by forming the first and the second waveguides 220 and 230, which are made of a silicon only to allow a signal to pass therethrough, on a photonic crystal structure having dielectrics arranged on a silicon substrate at a regular interval, and then forming cavities 240 along the first and the second waveguides 220 and 230, and thus can reduce the group velocity of light. A plurality of cavities arranged along the first and the second waveguides 220 and 230 to reduce the group velocity of light are illustrated in FIG. 2B, but a single cavity 240 is marked.

The dielectric may be a hole filled with air. The group velocity of light can be expressed by following equation 1:

$$Vg(K)=\omega Rk\sin(KR) \qquad \text{Equation 1}$$

wherein 'ω' denotes a resonance frequency of the cavity, 'k' denotes a coupling factor between the cavities, 'R' denotes a distance between the cavities, and 'K' denotes a wave vector. Since the light in the CROW structure has a slower group velocity than in an existing dielectric waveguide, it is possible to realize a compact-sized modulator. Accordingly, a size of the AD converter can be reduced and also power consumption can be reduced.

Figure 3A:
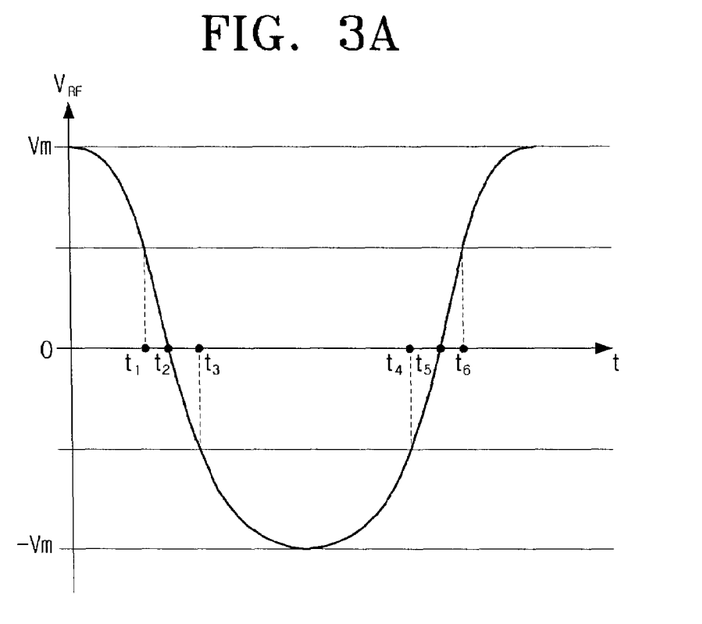
FIG. 3A is a view illustrating an example of a signal input to a modulation unit of the AD converter of FIG. 1.
Figure 3B:
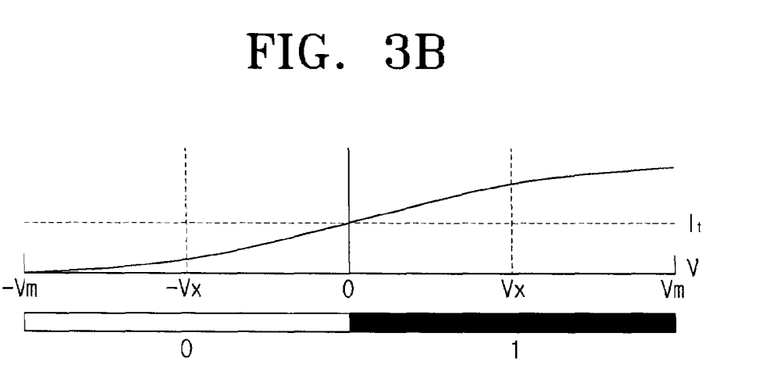
FIGS. 3B and 3C are views illustrating examples of an optical signal output according to the input signal of FIG. 3A.
Figure 3C:
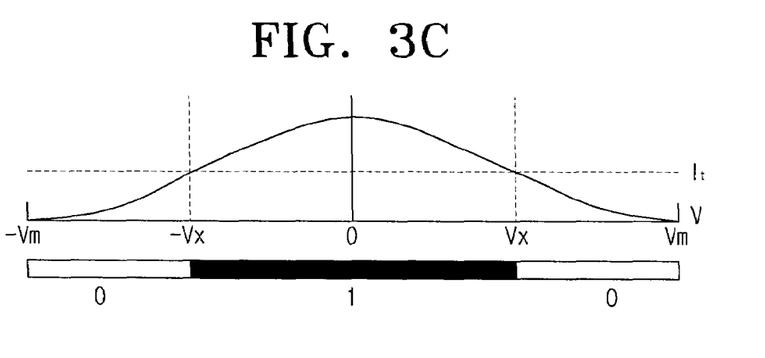
Figure 4A:
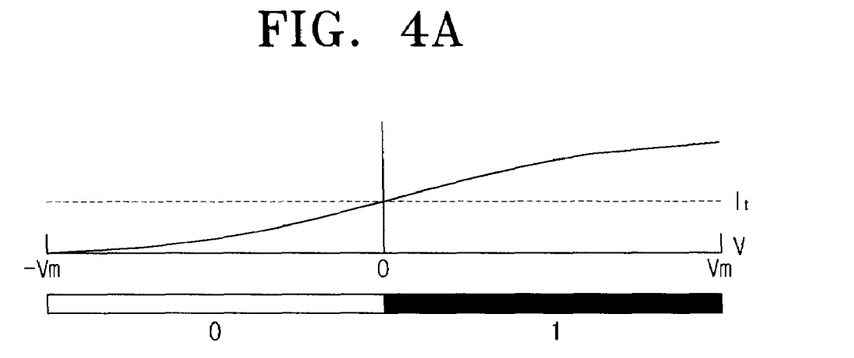
FIGS. 4A to 4D are views illustrating signals output from the respective waveguide units of FIG. 1.
Figure 4B:
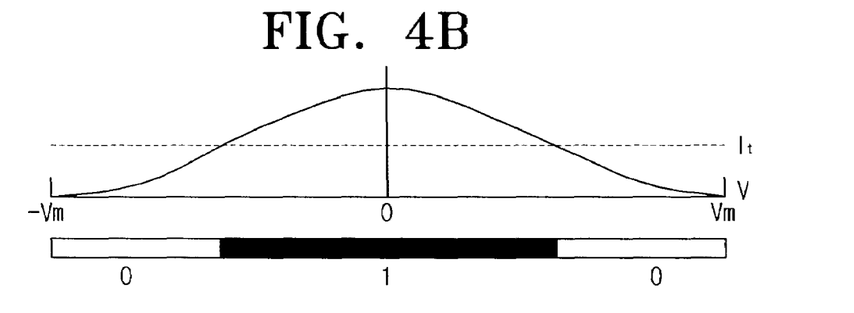
Figure 4C:
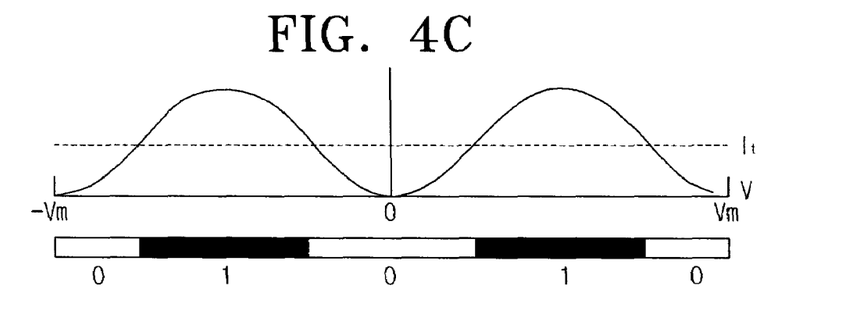
Figure 4D:
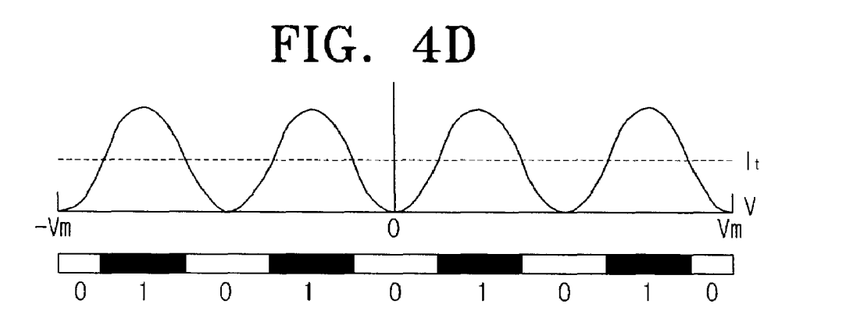

FIG. 3A is a view illustrating an example of a signal output from the modulation unit 130 of the AD converter of FIG. 1, and FIGS. 3B and 3C are views illustrating examples of an optical signal output according to the signal of FIG. 3A. Referring to FIG. 3A, the modulation unit 130 outputs a $V_{RF}$ ranging from −Vm to +Vm. Also, FIGS. 3B and 3C illustrate signals output from two waveguide units which are used to generate a 2-bit digital signal. In this example, the first and the second waveguide units 120-1 and 120-2 having the configuration of FIGS. 2A and 2B are used.

If the $V_{RF}$ signal is applied from the modulation unit 130, optical signals passing through the first and the second waveguide units 120-1 and 120-2 have the same signal. However, since the electrodes provided in the first and the second waveguides 120-1 and 120-2 differ from each other in their lengths, variation periods of magnitudes of optical signals differ from each other in the range from −Vm to +Vm of the input RF signal. That is, as a length of an electrode provided in each of the waveguide units 120-1 and 120-2 increases, a variation period of a magnitude of the output optical signal is shortened. As a result, the optical signal is modulated to have a larger number of peak values in the range from −Vm to +Vm of the $V_{RF}$ signal.

Referring to FIGS. 3B and 3C, a modulation is more frequent in FIG. 3C than in FIG. 3B in which the electrode has a relatively short length. Accordingly, as shown in FIG. 3B, the first waveguide unit 120-1 outputs an optical signal having a magnitude less than a reference value $I_t$ in a section where a voltage from −Vm to 0 is applied, while outputting an optical signal having a magnitude greater than the reference value $I_t$ in a section where a voltage from 0 to Vm. On the other hand, referring to FIG. 3C, the second waveguide unit 120-2 outputs an optical signal having a magnitude less than 1t in sections from −Vm to −Vx and from Vx to Vm, while outputting an optical signal having a magnitude greater than 1t in a section from −Vx to Vx.

The digital conversion unit 140 detects the magnitudes of the optical signals output from the first and the second guide units 120-1 and 120-2, compares them with a reference value, and outputs a 2-bit stream consisting of "0" or "1" according to the result of comparison. That is, in the section from −Vm to −Vx, the first waveguide unit 120-1 outputs "0" and the second waveguide unit 120-2 outputs "0" such that the digital conversion unit 140 outputs a digital bit stream such as "00". In this way, the digital conversion unit 140 obtains $2^2$ bit streams such as "00", "01", "11", "10".

As a result, if an analog signal is input as shown in FIG. 3A, the analog signal is converted to a digital signal of values such as "10", "11", "01", "00", "01", "11", "10" in the sections from 0 to $t_1$, from $t_2$ to $t_3$, from $t_3$ to $t_4$, and from $t_5$ to $t_6$, and the section above $t_6$.

FIGS. 4A to 4D are views illustrating signals output from four waveguide units 120-1 to 120-4 of FIG. 1, each having the configuration shown in FIGS. 2A and 2B.

If the lengths of electrodes exponentially increase from the first waveguide unit 120-1 to the fourth waveguide unit 120-4, i.e., if the lengths of the electrodes of the first through the fourth waveguide units 120-1 to 120-4 are in the ratio of 1:2:4:8, a variation period of magnitude of the optical signal is shortened from the first waveguide unit 120-1 to the fourth waveguide unit 120-4 in proportion to the lengths of the electrodes as shown in FIGS. 4A to 4D. That is, a modulation is performed such that the number of peak values in the range from −Vm to +Vx of the same input voltage increases from FIG. 4A to FIG. 4D. Accordingly, since four waveguide units 120-1 to 120-4 are used as described above, a 4-bit digital conversion can be performed.

That is, referring to FIGS. 4A to 4D, 16 digital streams such as "0000", "0001", "0011", "0010", . . . "1000" can be obtained in the respective sections. Since a method for detecting digital streams from the optical signals output from the respective waveguide units 120-1 to 120-4 is same as the 2-bit digital conversion described above, its detailed description is omitted.

The modulation unit 130 applies the RF signal to change the refractive index of the waveguide and thus modulate the optical signals. It is possible to modulate the optical signals at the waveguide using a free-carrier plasma dispersion effect in which a refractive index of silicon changes as a density of free carrier (electron or electron hole) of silicon changes. Modulating methods using a forward biased p-i-n diode, using a MOS capacitor, and using a reverse-biased PN junction are currently known.

Figure 5:
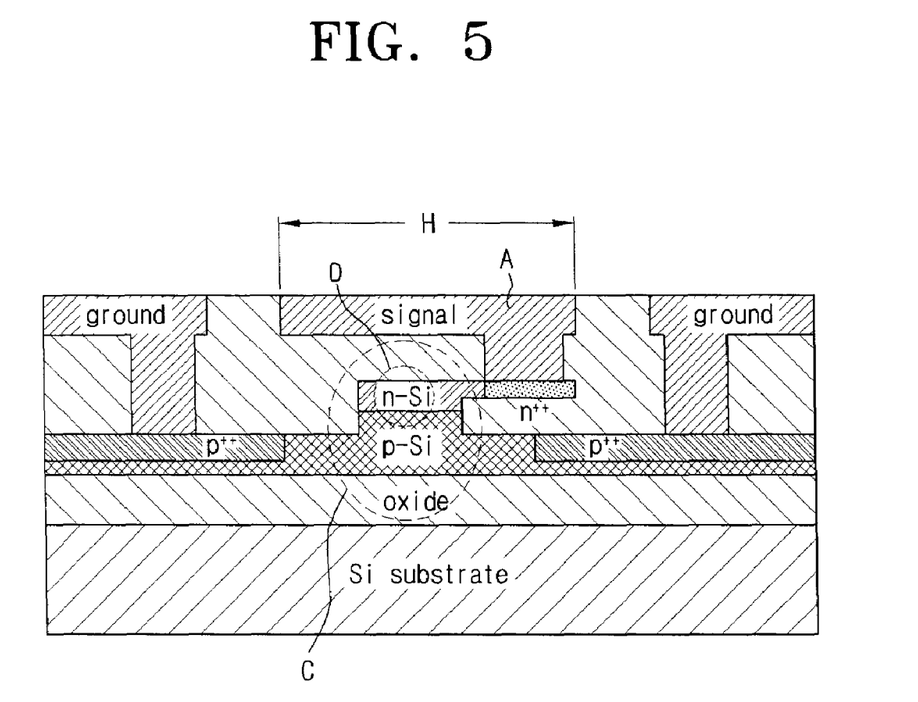
FIG. 5 is a view illustrating an example of a reverse-biased PN junction.

FIG. 5 illustrates an example of a reverse-biased PN junction. The density of carrier is controlled by adjusting a thickness of a depletion region marked "D" and finally a refractive index (RI) is changed so that the optical signal can be modulated. The method using the reverse-biased PN junction makes it possible to perform a high speed modulation at about 30 Gs/s compared to other methods.

Figure 6A:
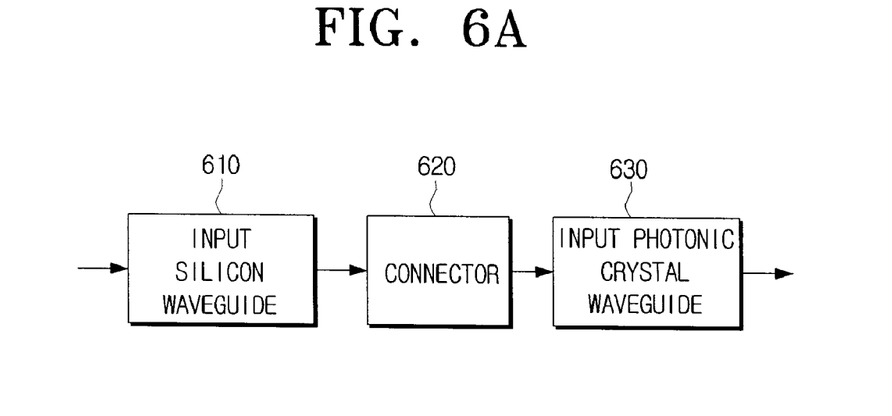
FIG. 6A is a block diagram illustrating an example of a configuration which is disposed between a light source unit and each of the waveguide units of FIG. 1.
Figure 6B:
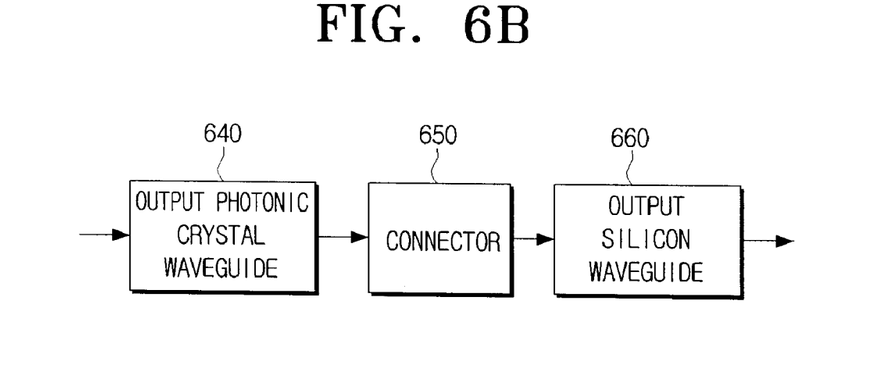
FIG. 6B is a block diagram illustrating an example of a configuration which is disposed between each of the waveguide units and a digital conversion unit of FIG. 1.

FIG. 6A is a view illustrating an example of configuration which may be arranged between the light source unit 110 and each of the waveguide units 120-1 to 120-4, and FIG. 6B is a view illustrating an example of configuration which may be arranged between each of the waveguide units 120-1 to 120-4 and the digital conversion unit 140.

Referring to FIG. 6A, an input silicon waveguide 610, a connector 620, and an input photonic crystal waveguide 630 may be included between the light source unit 110 and each of the waveguide units 120-1 to 120-4 to transmit the optical signal. The input silicon waveguide 610 receives the optical signal output from the light source unit 110. The input photonic crystal waveguide 630 transmits the optical signal output from the input silicon waveguide 610 to the respective waveguide units 120-1 to 120-4. Also, the connector 620 connects the input silicon waveguide 610 and the input photonic crystal waveguide 630 and is in a tapered shape.

The optical signal output from the light source unit 110 has different group velocities between the input silicon waveguide 610 and the input photonic crystal waveguide 630. That is, since the waveguide units 120-1 to 120-4 have the CROW structure, the photonic crystal waveguide 630 also has the CROW structure. Accordingly, there is a difference in a light velocity between the input silicon waveguide 610 and the input photonic crystal waveguide 630 since the group velocity is slowed due to the property of the CROW structure. In order to avoid this difference, a coupling exists and in order to solve this coupling problem, the connector 620 is in a tapered shape.

Referring to FIG. 6B, an output photonic crystal waveguide 640, a connector 650, and an output silicon wave guide 660 may be included between each of the waveguide units 120-1 to 120-4 and the digital conversion unit 140 to transmit the optical signal. In this case, the output photonic crystal waveguide 640 receives optical signals output from the waveguide units 120-1 to 120-4. The output silicon waveguide 660 transmits the optical signals output from the output photonic crystal waveguide 640 to the digital conversion unit 140. Also, the connector 650 connects the output silicon waveguide 660 and the output photonic crystal waveguide 640 and is in a tapered shape. The reason that the connector 650 is in a tapered shape and the operation thereof will be omitted since they are same as in FIG. 6A.

Figure 6C:
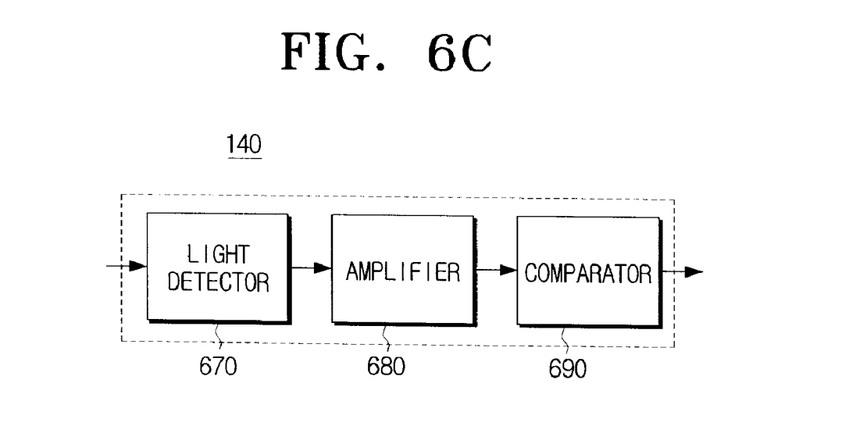
FIG. 6C is a block diagram illustrating the digital conversion unit of FIG. 1 in detail.

FIG. 6C is a block diagram illustrating the digital conversion unit 140 in detail. Referring to FIG. 6C, the digital conversion unit 140 comprises a light detector 670, an amplifier 680, and a comparator 690. The light detector 670 detects magnitudes of optical signals output from the respective waveguide units 120-1 to 120-4. More specifically, the light detector 670 is realized by photodiodes and outputs an electric signal of a magnitude corresponding to the magnitude of the output light.

The amplifier 680 amplifies the magnitude of the electric signal detected by the light detector 670. The comparator 680 compares the amplified signal with a reference signal corresponding to the reference value (i.e., 1t) and outputs a result of comparison. That is, the comparator 680 outputs a high pulse corresponding to a bit value "1" if the amplified signal is greater than the reference signal, and outputs a low pulse corresponding to a bit value "0" if the amplified signal is less than the reference signal.

Although a single light detector 670, a single amplifier 680, and a single comparator 690 are illustrated in FIG. 6C, they may be provided separately for each waveguide unit. Accordingly, bit values corresponding to the optical signals output from the waveguide units 120-1 to 120-4 are respectively output. Also, the bit values output from the respective comparators provided in the waveguide units 120-1 to 120-4 are combined into a single digital bit stream by a logic computing circuit (not shown).

Figure 7A:
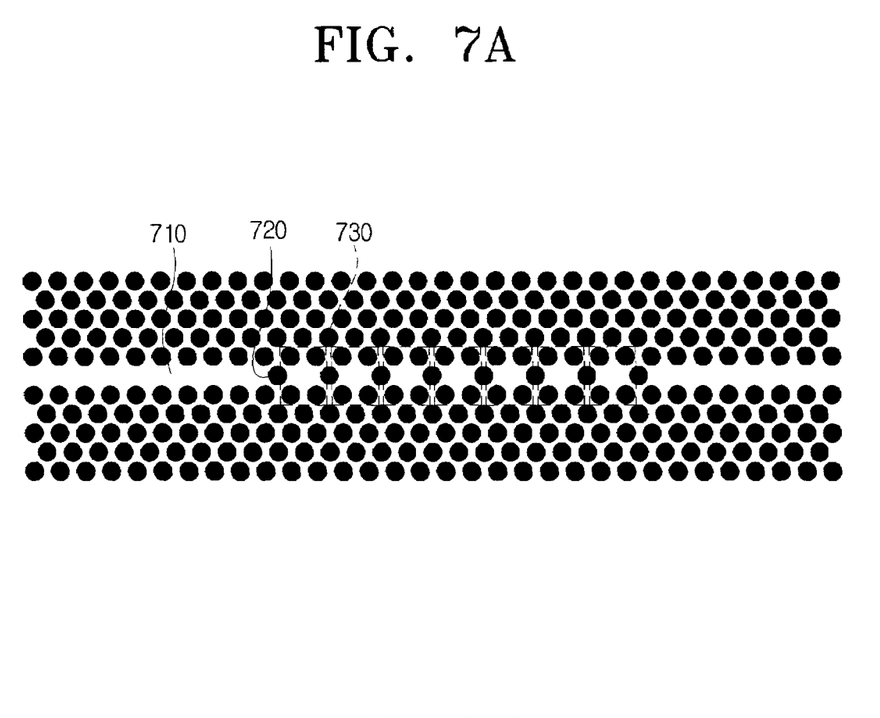
FIG. 7A is a view illustrating a waveguide unit according to another exemplary embodiment of the present invention.

FIG. 7A is a view illustrating a waveguide unit according to another exemplary embodiment of the present invention. Referring to FIG. 7A, a waveguide unit according to another exemplary embodiment of the present invention is of a CROW structure and comprises a waveguide 710 having at least one resonator 730.

More specifically, the waveguide 710 is an area having no dielectric formed on a silicon substrate where dielectrics 720 are arranged at a regular interval. In this case, some dielectrics 720 are arranged inside the waveguide 710, thereby configuring the CROW structure. An area between the dielectrics 720 arranged inside the waveguide 710 serves as a single resonator 730. In FIG. 7A, each of rectangular areas marked dashed lines serves as a single resonator 730.

Figure 7B:
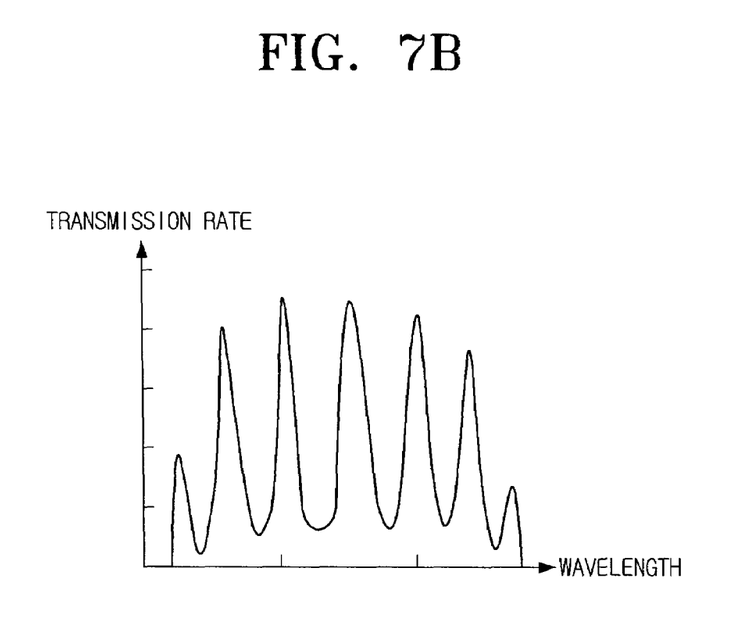
FIG. 7B is a view illustrating a waveform of an optical signal output from the waveguide unit of FIG. 7A.

FIG. 7B illustrates a waveform of an optical signal output from the waveguide unit of FIG. 7A. If an optical signal is applied to the waveguide having 7 resonators in total as shown in FIG. 7A, a waveform having 7 peak values is formed as shown in FIG. 7B. It is also possible to slow a group velocity of light due a plurality of cavities formed along the waveguide.

The modulation unit 130 modulates the optical signals output from the waveguide units by moving them parallel. In order to modulate the optical signals, each of the waveguide units comprises an electrode to receive a RF signal. The electrodes differ from one another in their lengths. If the RF signal is applied to the electrode disposed around the resonators, a refractive index change at the area where the RF signal is applied and the output signal waveform moves horizontally and parallel such that the optical signals are modulated. That is, if the RF signal is applied to the electrodes around the resonators, the output signal waveform moves horizontally and parallel such that a digital signal "1" is detected at a peak value and a digital signal "0" is detected at a wavelength other than the peak value.

Figure 8A:
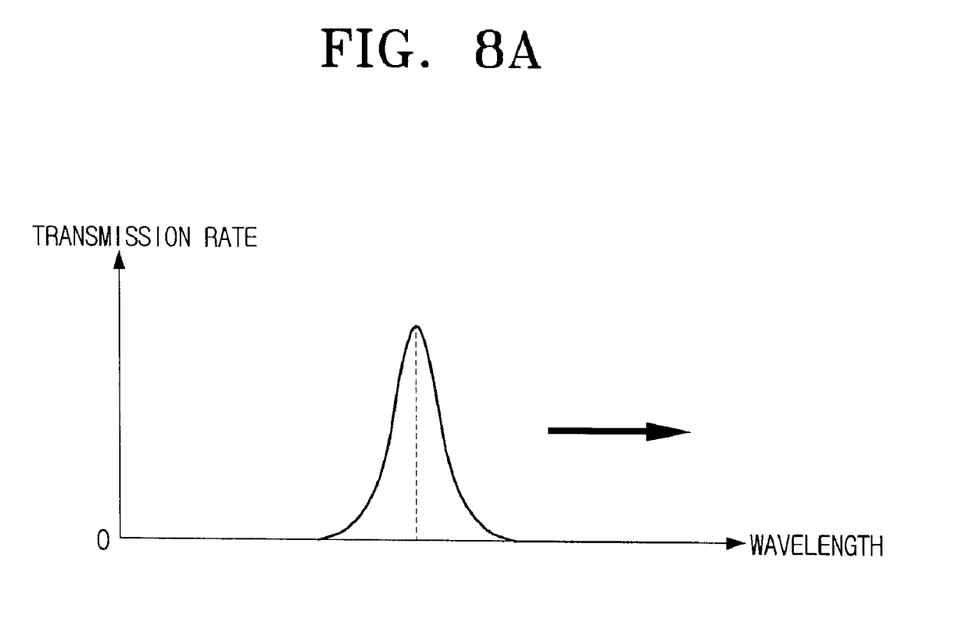
FIGS. 8A to 8C are views to explain a modulating operation performed through a plurality of waveguide units.
Figure 8B:
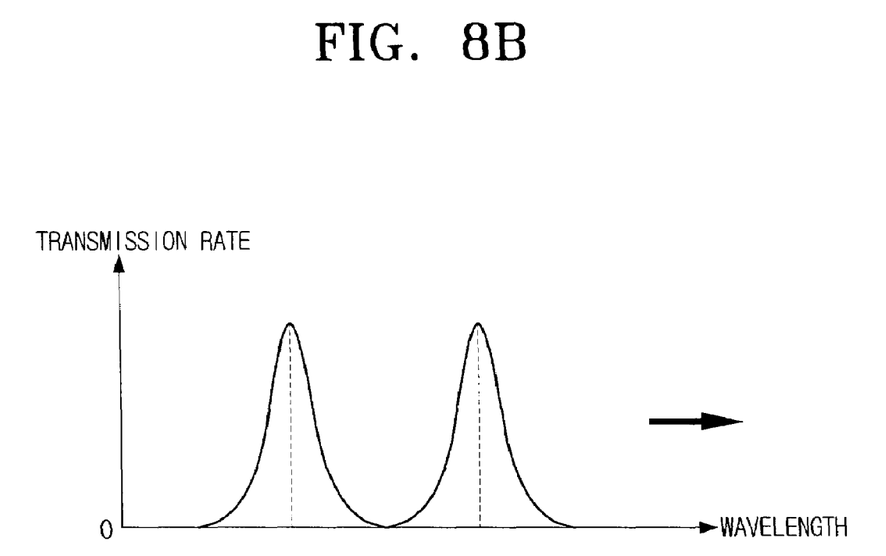
Figure 8C:
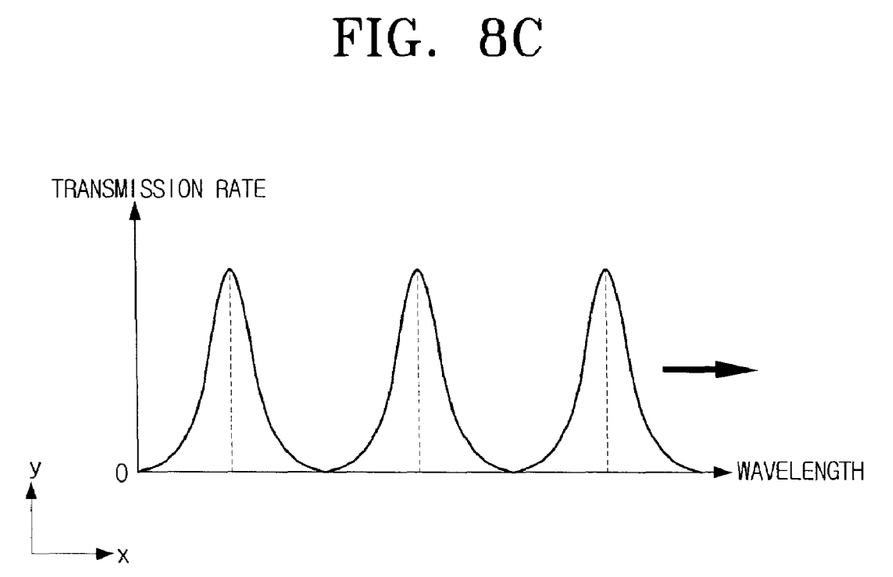

FIGS. 8A to 8C are views to explain a modulating operation performed through a plurality of the waveguide units. That is, an operation of converting an analog signal to a digital signal through a plurality of the waveguide units using a photonic crystal as shown in FIG. 7A will be explained.

FIG. 8A illustrates a waveform having a single peak value in the case where a single resonator is provided. If a RF signal is not applied to an electrode around the each resonator, a waveform does not move, but, if a RF signal is applied to the electrode around the resonator, the waveform moves in the direction of '+x'. Accordingly, digital signals having values "0", "1", "0" are detected in sequence at any specific wavelength value as the signal waveform moves.

If the peak value of the waveform shown in FIG. 8A passes a specific wavelength value, a digital signal "1" is detected. FIG. 8B illustrates an output signal waveform in the case where two resonators are provided, and FIG. 8C illustrates an output signal waveform in the case where 3 resonators are provided. If a RF signal is applied to electrodes around the resonators, the waveforms move parallel and in the direction of '+x'.

As a result, the waveforms output from the waveguide unit having a single resonator, from the waveguide unit having two resonators, and from the waveguide unit having 3 resonators are shown respectively in FIGS. 8A, 8B, and 8C, and if a RF signal is applied to the electrodes of the resonators at the same time, digital signals such as "000", "001" . . . are detected from the respective waveguide units at a specific wavelength value.

Figure 9A:
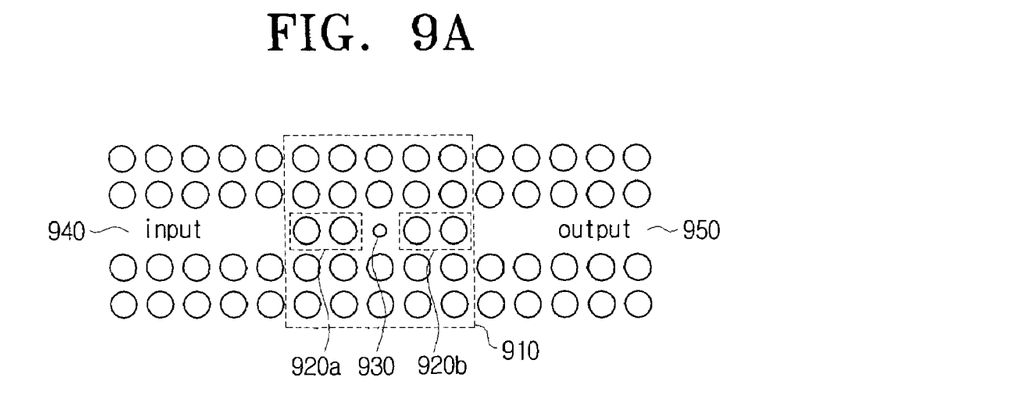
FIG. 9A is a view illustrating a waveguide unit according to still another exemplary embodiment of the present invention.
Figure 9B:
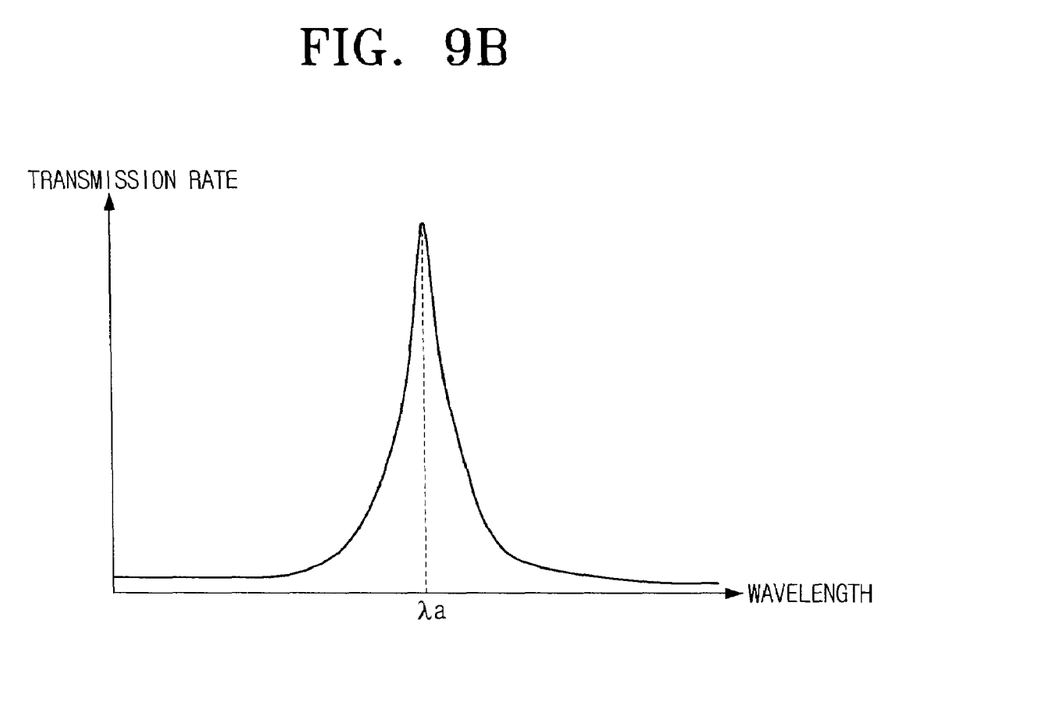
FIG. 9B is a view illustrating a waveform of a signal output from the waveguide unit of FIG. 9A.
Figure 9C:
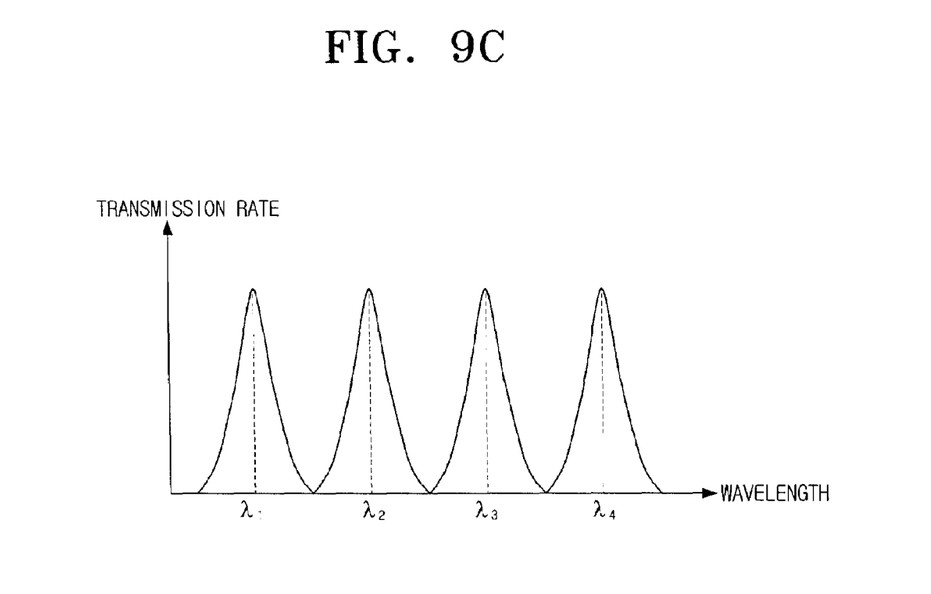
FIG. 9C is a view illustrating a waveform of a signal output from a waveguide unit having a plurality of resonators.

FIG. 9A is a view illustrating a waveguide unit according to still another exemplary embodiment of the present invention, FIG. 9B is a view illustrating a signal waveform output from the waveguide unit of FIG. 9A, and FIG. 9C is a view illustrating a signal waveform output from the waveguide unit having a plurality of resonators.

Referring to FIG. 9A, a waveguide unit according to still another exemplary embodiment of the present invention comprises waveguides 940 and 950 and a resonator 910 arranged on the waveguides 940 and 950. The resonator 910 comprises a plurality of first dielectrics 920a and 920b arranged on the waveguides 940 and 950 and a second dielectric 930 having a different permittivity from that of the first dielectrics 920a and 920b and arranged between the plurality of first dielectrics 920a and 920b to allow an optical signal output from the waveguides 940 and 950 to resonate at a specific wavelength.

The resonator 910 shown in FIG. 9A forms a waveform having a peak value at a specific wavelength $\lambda_a$ as shown in FIG. 9B. A frequency at the specific wavelength variously changes the specific wavelength having the peak value, for example, changes the size of the second dielectric 930 of the resonator 910 or changes the shape of the resonator 910. The modulation unit modulates an optical signal output from at least one waveguide unit by moving it parallel.

In FIG. 9A, the waveguide unit having a single resonator is illustrated. However, waveguides each having a single resonator are arranged in parallel, thereby forming a single waveguide unit. In this case, the resonators of the waveguides are designed to have different wavelengths and form a waveform shown in FIG. 9C.

That is, FIG. 9C illustrates a waveform having peak values at 4 specific wavelengths if 4 configurations each having a single resonator as shown in FIG. 9A are arranged in parallel. If the configurations having peak values at 4 specific wavelengths forms a single waveguide unit and a plurality of this waveguide unit is provided, it is possible to convert the optical signal to a 3-bit digital signal or other digital signal in the same way as described in FIGS. 8A to 8C.

In the configuration of FIG. 9A, an input signal passes through a tunneling toward an output. All of the input signals are not output through the tunneling and some signal is reflected toward the input and thus a transmission rate is reduced.

Figure 10A:
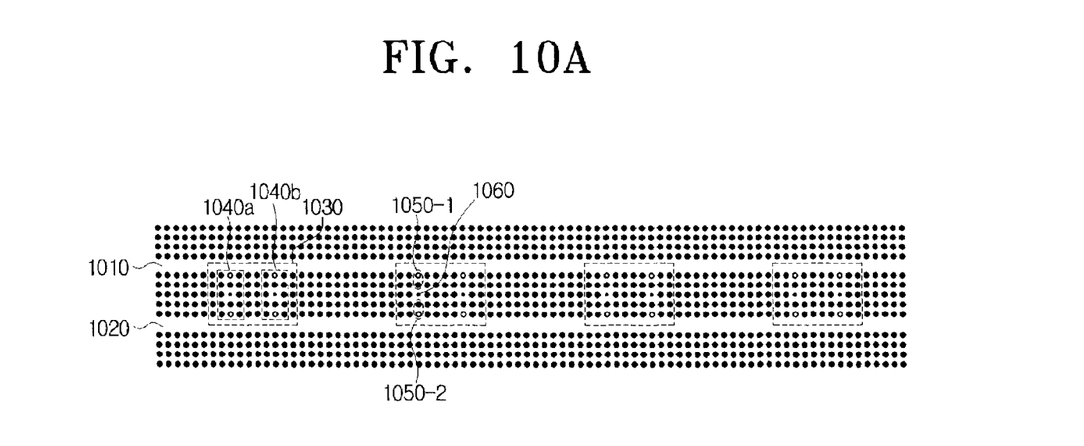
FIG. 10A is a view illustrating a waveguide unit according to still another exemplary embodiment of the present invention.
Figure 10B:
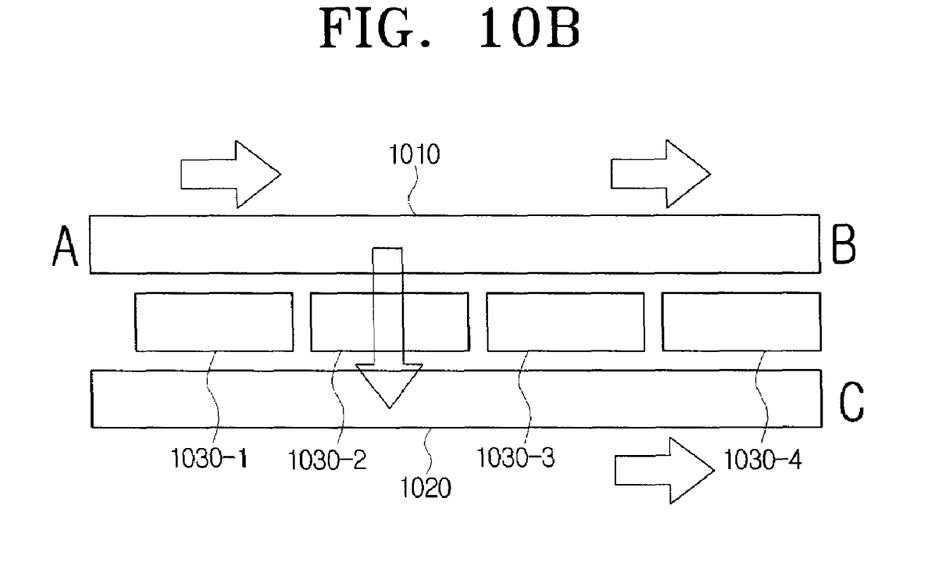
FIG. 10B is a view illustrating a waveform of a signal output from the waveguide unit of FIG. 10A.

FIG. 10A is a view illustrating a waveguide unit according to still another exemplary embodiment of the present invention. Also, FIG. 10B illustrate a signal waveform output from the waveguide unit of FIG. 10A.

Referring to FIG. 10A, at least one waveguide unit according to still another exemplary embodiment of the present invention comprises a first waveguide 1010, a second waveguide 1020 symmetrical to the first waveguide 1010 in its shape and sharing an optical signal with the first waveguide 1010, and at least one filter 1030 disposed between the first and the second waveguides 1010 and 1020 to pull one of optical signals input to the first waveguide 1010 that has a specific wavelength toward the second waveguide 1020.

The at least one filter 1030 comprises a plurality of resonators 1040a and 1040b. The plurality of resonators 1040a and 1040b each comprises a plurality of first dielectric 1050-1 and 1050-2 arranged between the first and the second waveguides 1010 and 1020, and a second dielectric 1060 having a different permittivity from that of the plurality of first dielectrics 1050-1 and 1050-2 and arranged between the plurality of first dielectrics 1050-1 and 1050-2.

The modulation unit 130 moves an optical signal output from the second waveguide 1020 parallel, and the digital conversion unit 140 digitally converts the optical signal moved parallel and output from the second waveguide 1020.

Referring to FIG. 10A, two waveguides 1010 and 1020 are arranged one on the other on a silicon substrate and are designed to control a direction of an optical signal input through the first and the second waveguides 1010 and 1020.

Referring to FIG. 10B, if a signal is applied to the area A of an upper transmission path, a filter 1030-2 having 2 resonators pulls only a signal of a specific wavelength area and outputs the signal to an area C of the second waveguide 1020. A wavelength area that is pulled but does not advance to the area C of the second waveguide 1020 does not return to the area A of the first waveguide 1010 and passes through an area B of the first waveguide 1010. Accordingly, since a specific wavelength property of a signal incident on the area A of the first waveguide 1010 is output through the area C of the second waveguide 1020 and the remaining signal is not be reflected, a transmission rate can be improved. That is, since no signal is returned to the area A, a transmission rate can be improved.

Since the filter having two resonators is arranged between two waveguides as shown in FIG. 10A, a reflective wave problem that an incoming signal is reflected and returned to an input terminal can be solved, and an AD converter of low power consumption and a high transmission rate can be realized.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An AD converter, comprising:
   a light source unit configured to provide an optical signal;
   at least one waveguide unit comprising a photonic crystal, the at least one waveguide unit being configured to receive the optical signal from the light source, and to output an output optical signal;
   a modulation unit configured to apply a RF signal to the at least one waveguide unit, thereby modulating the output optical signal output from the at least one waveguide unit; and
   a digital conversion unit configured to convert the modulated output optical signal to a digital signal,
   wherein the at least one waveguide unit comprises:
   a first waveguide;
   a second waveguide that is symmetrical to the first waveguide in its shape, the second waveguide being configured to share the optical signal with the first waveguide; and
   at least one filter arranged between the first and the second waveguides so as to direct at least a portion of the optical signal input to the first waveguide that has a specific toward the second waveguide.

2. The AD converter as claimed in claim 1, wherein the at least one waveguide unit further comprises:
   an electrode connected to the first waveguide to thereby apply thereto the RF signal,
   wherein, if the RF signal is applied to the first waveguide, the second waveguide outputs a first optical signal having a phase difference from that of a second optical signal output from the first waveguide.

3. The AD converter as claimed in claim 2, wherein the at least one waveguide unit comprises a plurality of waveguide units, the electrode comprising a plurality of electrodes each of which being connected to a respective corresponding one of the plurality of waveguide units, the waveguide units having different lengths from one another.

4. The AD converter as claimed in claim 1, wherein at least one of the first and second waveguides has a Coupled Resonator Optical Waveguide (CROW) structure and is provided with at least one resonator,
   wherein the modulation unit moves optical signals output from the at least one waveguide unit parallel with one another.

5. The AD converter as claimed in claim 4, wherein the at least one waveguide unit further comprises an electrode connected thereto to receive therethrough the RF signal.

6. The AD converter as claimed in claim 5, wherein the at least one waveguide unit comprises a plurality of waveguide units, the electrode comprising a plurality of electrodes each of which being connected to a respective corresponding one of the plurality of waveguide units, the waveguide units having different lengths from one another.

7. The AD converter as claimed in claim 1, wherein the at least one waveguide unit comprises:
   a resonator which is disposed on at least one of the first and second waveguides.

8. The AD converter as claimed in claim 7, wherein the modulation unit moves optical signals output from the at least one waveguide unit parallel with one another.

9. The AD converter as claimed in claim 7, wherein the resonator comprises:
   a plurality of first dielectrics which is formed on the at least one of the first and second waveguides; and a second dielectric arranged between the plurality of first dielectrics, the second dielectric having a different permittivity from that of the plurality of first dielectrics to allow at least a portion of the output optical signal output from the at least one of the first and second waveguides to resonate at a specific wavelength.

10. The AD converter as claimed in claim 1, wherein the at least one filter comprises one or more resonators disposed between the first and the second waveguides, each of the one or more resonators comprising a plurality of first dielectrics and a second dielectric disposed between at least two of the plurality of first dielectrics, the second dielectric having a different permittivity from that of the plurality of first dielectrics.

11. The AD converter as claimed in claim 1, wherein the modulation unit moves optical signals output from the at least one waveguide unit parallel with one another,
wherein the digital conversion unit digitally converts the optical signals output from the second waveguide of each of the at least one waveguide unit.

12. The AD converter as claimed in claim 1, further comprising:
an input silicon waveguide which receives the optical signal output from the light source unit;
an input photonic crystal waveguide which transmits the optical signal output from the input silicon waveguide to the at least one waveguide unit; and
a connector which connects the input silicon waveguide and the input photonic crystal waveguide, and which is in a tapered shape.

13. The AD converter as claimed in claim 1, further comprising:
an output photonic crystal waveguide which receives the output optical signal output from the at least one waveguide unit;
an output silicon waveguide which transmits the output optical signal output from the output photonic crystal waveguide to the digital conversion unit; and
a connector which connects the output silicon waveguide and the output photonic crystal waveguide, and which is in a tapered shape.

14. The AD converter as claimed in claim 1, wherein the digital conversion unit comprises:
a light detector which detects a magnitude of the output optical signal output from the at least one waveguide unit;
an amplifier which amplifies the magnitude of the signal detected by the light detector; and
a comparator which compares the amplified signal with a reference signal, and which outputs a comparison result value.

15. The AD converter as claimed in claim 1, wherein the modulation unit changes a refraction index of at least one of the first and second waveguides of the at least one waveguide unit using a plasma dispersion effect.

16. The AD converter as claimed in claim 1, wherein the modulation unit performs a modulation using either a reversed biased PN junction or a forward biased p-i-n junction.

* * * * *